US009109082B2

(12) United States Patent
Mathieu et al.

(10) Patent No.: US 9,109,082 B2
(45) Date of Patent: Aug. 18, 2015

(54) METHOD FOR INCREASING THE RECYCLABILITY OF A POLYAMIDE USED IN SINTERING

(75) Inventors: Cyrille Mathieu, Rouen (FR); Arnaud Lemaitre, Saint Martin-Saint Firmin (FR)

(73) Assignee: ARKEMA FRANCE, Colombes (FR)

( * ) Notice: Subject to any disclaimer, the term of this patent is extended or adjusted under 35 U.S.C. 154(b) by 71 days.

(21) Appl. No.: 13/484,610

(22) Filed: May 31, 2012

(65) Prior Publication Data

US 2012/0329932 A1 Dec. 27, 2012

(30) Foreign Application Priority Data

May 31, 2011 (FR) ..................................... 11 54744

(51) Int. Cl.

| | |
|---|---|
| ***C08L 77/00*** | (2006.01) |
| ***C08G 69/02*** | (2006.01) |
| ***B29C 67/00*** | (2006.01) |
| ***C08G 69/04*** | (2006.01) |
| ***C08J 3/12*** | (2006.01) |
| ***C08K 3/38*** | (2006.01) |
| *C08J 11/04* | (2006.01) |
| *C08K 3/24* | (2006.01) |
| *C08K 3/32* | (2006.01) |

(52) U.S. Cl.

CPC ............ *C08G 69/02* (2013.01); *B29C 67/0077* (2013.01); *C08G 69/04* (2013.01); *C08J 3/12* (2013.01); *C08K 3/38* (2013.01); *C08J 11/04* (2013.01); *C08J 2377/00* (2013.01); *C08K 3/24* (2013.01); *C08K 3/32* (2013.01); *Y02W 30/70* (2015.05)

(58) Field of Classification Search

CPC ....... B29C 67/0077; C08G 69/04; C08K 5/55
USPC .......................................................... 524/414
See application file for complete search history.

(56) References Cited

U.S. PATENT DOCUMENTS

| | | | | |
|---|---|---|---|---|
| 4,334,056 | A | 6/1982 | Meyer et al. | |
| 4,640,976 | A * | 2/1987 | Curatolo et al. | 528/336 |
| 6,281,282 | B1 * | 8/2001 | Breitenbach et al. | 524/556 |
| 2004/0102539 | A1 | 5/2004 | Monsheimer et al. | |
| 2006/0030692 | A1 * | 2/2006 | Montanari et al. | 528/310 |
| 2008/0274355 | A1 * | 11/2008 | Hewel | 428/402 |
| 2013/0004448 | A1 * | 1/2013 | Mathieu et al. | 424/69 |

FOREIGN PATENT DOCUMENTS

| | | | |
|---|---|---|---|
| EP | 1 413 595 | A1 | 4/2004 |
| FR | 2 873 380 | A1 | 1/2006 |
| FR | 2 952 062 | A1 | 5/2011 |
| JP | 10-81820 | A | 3/1998 |
| WO | WO 2011/045550 | * | 4/2011 |

OTHER PUBLICATIONS

Search Report, dated Jan. 17, 2012, issued in FR 1154744.

* cited by examiner

*Primary Examiner* — Doris Lee

(74) *Attorney, Agent, or Firm* — Millen, White, Zelano & Branigan, P.C.

(57) ABSTRACT

The present invention relates to a method for increasing the recyclability of a polyamide in a sintering process, wherein at least 4000 ppm of at least one acid is incorporated in the polyamide, said acid being selected from: the acids of general formula HxPyOz in which x, y and z are integers selected in the range from 1 to 7, boric acid, the salts of these acids, their esters, their anhydrides and mixtures thereof.

11 Claims, 3 Drawing Sheets

METHOD FOR INCREASING THE RECYCLABILITY OF A POLYAMIDE USED IN SINTERING

The present invention relates to the manufacture of polyamide powders that can be recycled several times in processes for layer-by-layer manufacture of objects by agglomeration of powder by fusion or sintering caused by radiation.

Said radiation can be a laser beam (in the case of laser sintering), infrared radiation or UV radiation or any source of electromagnetic radiation. Such processes are notably described in documents U.S. Pat. No. 6,136,948 and WO9606881. The term “sintering” in the present description includes all these processes, whatever the type of radiation. Although in the following text reference is most often made to the laser sintering process, what is written for laser sintering is of course valid for the other sintering processes.

The polyamide powders used in sintering typically have a volume-median diameter D50 in the range from 5 to 200 μm.

In sintering processes, it is recommended to use a polyamide for which the difference between the first heat melting point Tm1 and the crystallization temperature Tc is as large as possible to avoid distortion phenomena, and whose enthalpy of fusion ΔHf is as high as possible to obtain good geometric definition of the manufactured articles. This makes it possible to increase the operating window with the polyamide powder and to make it much easier to use in a sintering process. Methods of obtaining said powders are notably described in documents FR2867190, FR2873380, and FR2930555. Preferably, the difference Tm1-Tc of the PA powders used in sintering is in the range from 30° C. to 50° C.

For sintering processes, such as laser sintering, it is also preferable to use polyamide powder with the following properties:

The molecular weight of the powder in the solid state is preferably sufficiently low, i.e. with intrinsic viscosity in solution below 2, both so that fusion of the particles does not require too much energy and so that there is sufficient interparticle coalescence during passage of the radiation so as to obtain an object with the lowest possible porosity, with good mechanical properties.

When molten, the powder must be able to increase in viscosity, to reach a sufficient molecular weight, and guarantee a viscosity of the part in solution greater than 1.5, so that the part (3D object) has acceptable mechanical properties. “Acceptable mechanical properties” typically means a modulus above 1300 MPa and an elongation at break greater than 15% for objects constructed in X/Y, i.e. manufactured predominantly in the two horizontal dimensions or “flat” in the sintering device.

In the course of each construction, also called a “run”, a large proportion of the powder is not used: about 85% of the powder is unaffected by the laser. It is therefore advantageous to be able to reuse, i.e. recycle, this powder in the next construction (or next “run”). The polyamide powder must have retained its initial properties as far as possible: colour, viscosity, mechanical properties.

It will be apparent that certain polyamide powders require modifying the parameters of the sintering device, in particular dramatically increasing the power of the radiation, at each recycling of the powder during successive runs. Moreover, it is seen that there is a marked decline in mechanical properties of the parts obtained as the runs proceed: the tensile modulus is lower and lower, passing under the threshold of 1300 MPa starting from the second run, and the elongation at break becomes less than 15% starting from the fourth run.

During construction by sintering, the surrounding powder, i.e. that unaffected by the radiation, remains above its crystallization temperature Tc for several hours, which can lead to an increase in molecular weight and therefore viscosity of the polyamide (a phenomenon called “viscosity rise”). Therefore coalescence between the powder particles becomes more and more difficult during successive runs. These problems are notably mentioned in paragraphs [0012] and [0013] of patent document US20060071359.

Several solutions have already been proposed that aim to control or limit these variations in molecular weight of the powder in the solid state.

Document US2004010239 proposes adding chain limiters, by supplying carboxyl groups in excess during polymerization of polyamide 12.

Document US2004106691 proposes the use of metal soaps (0.5%) added to the polyamide powder. However, when in contact with certain solvents, objects made from these powders tend to salt-out derivatives of metal salts, which limits their use to certain applications.

Document US20060071359 mentions, in paragraph [0015], the drawbacks of the solutions described in the two aforementioned documents. The parts obtained by LS have insufficient elongation at break (less than 10%). This is said to be due to the fact that the viscosity rise (in mass) of the polyamide of which the parts are constituted is insufficient to provide acceptable mechanical properties. To solve this problem, document US20060071359 proposes a mixture of polyamides with diacid chain ends and polyamides with diamine chain ends. On paper, this method can seem close to perfect: In the solid state, i.e. for the powder unaffected by the laser, there is no reaction between the polyamide with diacid ends and the polyamide with diamine ends, and therefore no increase in molecular weight of the initial powder. In theory the powder would therefore be 100% recyclable. In the molten state (i.e. for the powder that constitutes the part being constructed), the mixture of diacid PA and diamine PA reacts and increases in molecular weight, ensuring that correct mechanical properties are obtained.

Document US20090291308 points out several drawbacks of these mixtures of polyamide with diacid controlled chain ends and polyamide with diamine controlled chain ends, in particular in paragraph [0006] of this document: The user is in fact obliged to use this specific powder with properties different from the powder usually employed in sintering processes, and this powder does not meet the requirements in terms of process conditions and products obtained by laser sintering.

Another solution for improving the recyclability of the polyamide powder is described in document U.S. Pat. No. 7,229,272, which relates to a method of treatment of the used powder by liquefaction, in which the powder is passed through a fluid. However, this method does not offer adequate performance, so that at high content of recycled powder (above 80 wt. %), surface defects are observed, such as an “orange peel” effect, i.e. a rough surface on the object obtained by sintering, as is confirmed by document US20090291308 in paragraph [0005].

The method claimed in document US20090291308 consists of treating the powder used in the preceding run before recycling said treated powder during a subsequent run. The treatment consists of placing a polyamide in water or steam at high temperature (130 to 150° C.) to hydrolyse it and therefore reduce its molecular weight. The final molecular weight is controlled by varying the treatment time and temperature. This method requires, between 2 successive runs, and close to the sintering device, treating the powder with steam and drying it (see claims 32 to 36 in particular). This method, requiring numerous intermediate steps between the runs, is not economically viable.

The aim of the present invention is therefore to supply powders that are easy to use and can be recycled several times, i.e. at least 4 times, in sintering processes, and which generate objects with acceptable mechanical properties.

The applicant has now found that by using at least 4000 ppm of certain acids in polyamide, it was possible to improve the recyclability of polyamide powders in sintering processes. The applicant realized that, surprisingly, the method according to the invention made it possible both to:

- inhibit the change in molecular weight of the powder in the solid state when it is not used during a run so as to be able to recycle it and,
- not to block the change in molecular weights of the molten powder constituting the object, so that the mechanical properties of the object obtained are acceptable and reproducible during the runs.

The present invention therefore relates to a method for increasing the recyclability of a polyamide in a sintering process, in which at least 4000 ppm, preferably from 4000 to 10000 ppm of at least one acid is incorporated in the polyamide, said acid being selected from: the acids of general formula HxPyOz, boric acid, salts of these acids, their esters, their anhydrides and mixtures thereof.

In the formula of the acid HxPyOz, H is hydrogen, P is phosphorus, O is oxygen, and x, y and z are integers selected in the range from 1 to 7.

Other acids, in particular acids other than boric acid and oxy acids other than those based on phosphorus, did not lead to polyamide with satisfactory physicochemical properties.

The polyamide usable in the method of the invention can be a homopolyamide or a copolyamide. It can be a mixture of polyamide and at least one other polymer, the polyamide forming the matrix and the other polymer or polymers forming the dispersed phase.

Advantageously, the polyamide is in divided form, such as powder or granules. The granules thus treated can then be ground to make powders.

"Polyamide" means, in the sense of the invention, the products of condensation:

- of one or more amino acids, such as the aminocaproic, amino-7-heptanoic, amino-11-undecanoic and amino-12-dodecanoic acids of one or more lactams such as caprolactam, oenantholactam and lauryllactam;
- of one or more salts or mixtures of diamines such as hexamethylenediamine, decanediamine, dodecamethylenediamine, metaxylylenediamine, bis-p aminocyclohexylmethane and trimethylhexamethylenediamine with diacids such as isophthalic, terephthalic, adipic, azelaic, suberic, sebacic and dodecanedicarboxylic acids. As examples of polyamide, we may mention PA 6, PA 6.6, PA 10.10, PA 11 and PA 12.

Copolyamides can also be used. We may mention the copolyamides resulting from the condensation of at least two different monomers, for example at least two different alpha omega aminocarboxylic acids or two different lactams or a lactam and an alpha omega aminocarboxylic acid with different number of carbons. We may also mention the copolyamides resulting from the condensation of at least one alpha omega aminocarboxylic acid (or a lactam), at least one diamine and at least one dicarboxylic acid. We may also mention the copolyamides resulting from the condensation of an aliphatic diamine with an aliphatic dicarboxylic acid and at least one other monomer selected from aliphatic diamines different from the preceding one and aliphatic diacids different from the preceding one.

The term "monomer" in the following description must be taken in the sense of "repeating unit". The case when a repeating unit consists of the combination of a diacid with a diamine is a special case. It is regarded as the combination of a diamine and a diacid, i.e. the diamine.diacid pair (in equimolar amount), which corresponds to the monomer. This can be explained by the fact that individually, the diacid or the diamine is only one structural unit, which is not sufficient in itself to form a polymer.

As examples of lactams, we may mention those having from 3 to 12 carbon atoms on the main ring, and which may be substituted. We may mention for example beta,beta-dimethylpropiolactam, alpha,alpha-dimethylpropiolactam, amylolactam, caprolactam, capryllactam and lauryllactam.

As examples of alpha omega aminocarboxylic acid we may mention amino-undecanoic acid and aminododecanoic acid. As examples of dicarboxylic acid we may mention adipic acid, sebacic acid, isophthalic acid, butanedioic acid, 1,4-cyclohexyldicarboxylic acid, terephthalic acid, sodium or lithium salt of sulphoisophthalic acid, dimerized fatty acids (these dimerized fatty acids have a content of dimer of at least 98% and are preferably hydrogenated) and dodecanedioic acid HOOC—$(CH_2)_{10}$—COOH.

The diamine can be an aliphatic diamine having from 6 to 12 atoms, it can be aryl and/or saturated cyclic. As examples we may mention hexamethylenediamine, piperazine, tetramethylenediamine, octamethylenediamine, decamethylenediamine, dodecamethylenediamine, 1,5-diaminohexane, 2,2,4-trimethyl-1,6-diamino-hexane, diamine polyols, isophorone diamine (IPD), methyl pentamethylenediamine (MPDM), bis(aminocyclohexyl)methane (BACM), bis(3-methyl-4-aminocyclohexyl)methane (BMACM).

As examples of copolyamides, we may mention copolymers of caprolactam and lauryllactam (PA 6/12), copolymers of caprolactam, adipic acid and hexamethylenediamine (PA 6/6.6), copolymers of caprolactam, lauryllactam, adipic acid and hexamethylenediamine (PA 6/12/6.6), copolymers of caprolactam, lauryllactam, 11-undecanoic amino acid, azelaic acid and hexamethylenediamine (PA 6/6.9/11/12), copolymers of caprolactam, lauryllactam, 11-undecanoic amino acid, adipic acid and hexamethylenediamine (PA 6/6.6/11/12), copolymers of lauryllactam, azelaic acid and hexamethylenediamine (PA 6.9/12), copolymers of 11-undecanoic amino acid, terephthalic acid and decamethylenediamine (PA 11/10.T).

Blends of polyamides can be used. These are for example blends of aliphatic polyamides and semi-aromatic polyamides and blends of aliphatic polyamides and cycloaliphatic polyamides.

As examples, we may mention the transparent compositions described in patent application EP1227131 comprising by weight, the total being 100%:

- 5 to 40% of an amorphous polyamide (B) which results essentially from the condensation:
  - either of at least one diamine selected from the cycloaliphatic diamines and aliphatic diamines and at least one diacid selected from cycloaliphatic diacids and aliphatic diacids, at least one of these diamine or diacid units being cycloaliphatic,
  - or of a cycloaliphatic alpha omega aminocarboxylic acid,
  - or of a combination of these two possibilities, and optionally of at least one monomer selected from alpha omega aminocarboxylic acids or the optional corresponding lactams, aliphatic diacids and aliphatic diamines, 0 to 40% of a flexible polyamide (C) selected from copolymers with polyamide blocks and polyether blocks and copolyamides, 0 to 20% of a compatibilizer (D) of (A) and (B), 0 to 40% of a flexible modifier (M), with the condition that (C)+(D)+(M) is between 0 and 50%, the complement to 100% of a semicrystalline polyamide (A).

We may also mention the transparent compositions described in patent application EP 1227132 comprising by weight, the total being 100%:

5 to 40% of an amorphous polyamide (B) that results essentially from the condensation of at least one diamine, optionally cycloaliphatic, of at least one aromatic diacid and optionally of at least one monomer selected from: alpha omega aminocarboxylic acids, aliphatic diacids, aliphatic diamines, 0 to 40% of a flexible polyamide (C) selected from copolymers with polyamide blocks and polyether blocks and copolyamides, 0 to 20% of a compatibilizer (D) of (A) and (B), (C)+(D) is between 2 and 50%, with the condition that (B)+(C)+(D) is not below 30%, the complement to 100% of a semicrystalline polyamide (A).

Replacing a proportion of the polyamide with a copolymer with polyamide blocks and polyether blocks, i.e. using a mixture comprising at least one of the preceding polyamides and at least one copolymer with polyamide blocks and polyether blocks, would remain within the scope of the invention.

The copolymers with polyamide blocks and polyether blocks result from the copolycondensation of polyamide blocks with reactive ends with polyether blocks with reactive ends, such as, among others:

1) Polyamide blocks with diamine chain ends with polyoxyalkylene blocks with dicarboxylic chain ends.

2) Polyamide blocks with dicarboxylic chain ends with polyoxyalkylene blocks with diamine chain ends obtained by cyanoethylation and hydrogenation of aliphatic alpha-omega dihydroxylated polyoxyalkylene blocks called polyetherdiols.

3) Polyamide blocks with dicarboxylic chain ends with polyetherdiols, the products obtained being, in this particular case, polyetherester amides. These copolymers are used advantageously.

The polyamide blocks with dicarboxylic chain ends are derived, for example, from the condensation of alpha-omega aminocarboxylic acids, lactams or dicarboxylic acids and diamines in the presence of a chain-limiting dicarboxylic acid.

The polyether can be for example a polytetramethylene glycol (PTMG). The latter is also called polytetrahydrofuran (PTHF).

The number-average molecular weight of the polyamide blocks is between 300 and 15000 and preferably between 600 and 5000 g/mol. The molecular weight of the polyether blocks is between 100 and 6000 and preferably between 200 and 3000 g/mol.

The polymers with polyamide blocks and polyether blocks can also comprise randomly distributed units. These polymers can be prepared by simultaneous reaction of the polyether and of the precursors of the polyamide blocks.

For example, polyetherdiol, a lactam (or an alpha-omega amino acid) and a chain-limiting diacid can be reacted in the presence of a little water. A polymer is obtained having essentially polyether blocks, polyamide blocks of very variable length, but also the various reagents that have reacted randomly and are randomly distributed along the polymer chain.

The polyetherdiol blocks are either used as they are and copolycondensed with polyamide blocks with carboxylic ends, or they are aminated to be converted to polyether diamines and condensed with polyamide blocks with carboxylic ends. They can also be mixed with polyamide precursors and a chain limiter to produce the polymers with polyamide blocks and polyether blocks having randomly distributed units.

The ratio of the amount of copolymer with polyamide blocks and polyether blocks to the amount of polyamide is advantageously between 1/99 and 15/85 by weight.

Regarding the blend of polyamide and at least one other polymer, it is in the form of a blend with polyamide matrix and/or the other polymer(s) form the dispersed phase. As an example of this other polymer, we may mention polyolefins, polyesters, polycarbonate, PPO (abbreviation for polyphenylene oxide), PPS (abbreviation for polyphenylene sulphide), and elastomers.

The polyamide, whether or not it is mixed with at least one other polymer, can contain fillers, pigments, antioxidants and anti-UV agents.

The method of the invention is particularly useful for the polyamides selected from PA 11, PA 12, aliphatic polyamides resulting from the condensation of an aliphatic diamine having from 6 to 12 carbon atoms and an aliphatic diacid having from 9 to 12 carbon atoms and the copolyamides 11/12 having either more than 90 percent of units 11 or more than 90 percent of units 12.

As examples of aliphatic polyamides resulting from the condensation of an aliphatic diamine having from 6 to 12 carbon atoms and of an aliphatic diacid having from 9 to 12 carbon atoms, we may mention PA 6.12 resulting from the condensation of hexamethylenediamine and 1,12-dodecanedioic acid; PA 9.12 resulting from the condensation of the C9 diamine and 1,12-dodecanedioic acid; PA 10.10 resulting from the condensation of the C10 diamine and 1,10-decanedioic acid; PA 10.12 resulting from the condensation of the C10 diamine and 1,12-dodecanedioic acid.

As for the copolyamides 11/12 having either more than 90% of units 11 or more than 90% of units 12, they result from the condensation of 11-undecanoic amino acid with lauryllactam (or C12 alpha omega amino acid).

The use of a mixture of polyamides would be within the scope of the invention.

The acid usable in the method of the invention is preferably selected from hypophosphorous acid $H_3PO_2$, phosphorous acid $H_3PO_3$, phosphoric acid $H_3PO_4$, pyrophosphoric (also called diphosphoric) acid $H_4P_2O_7$, metal phosphates, metal phosphites, metal hypophosphites, phosphoric and phosphorous esters and anhydrides, and mixtures thereof. These acids are moreover commonly used as catalysts of the reaction of polycondensation of certain polyamides, but always on the basis of contents below 3000 ppm.

Preferably, said at least one acid comprises a mixture of hypophosphorous acid $H_3PO_2$ and phosphoric acid $H_3PO_4$, with a weight ratio in the range from 10/90 to 90/10.

Advantageously, the composition according to the invention is in the form of powder with volume-median diameter (D50) in the range from 5 to 200 μm.

According to the method of the invention, the acid as defined above is incorporated by at least one of the following methods: impregnation of the polyamide in an aqueous dispersion of the acid, addition of acid during synthesis of polyamide, notably at the beginning or at the end of synthesis, addition by mixing by compounding, or during any step of a process for manufacture of powder from said polyamide, notably by dissolution-precipitation of polyamide in a solvent containing the acid, for example dispersed or dissolved in the solvent.

According to a preferred embodiment of the invention, the acid is added by impregnation of the polyamide in an aqueous dispersion of the acid. Thus, the melting point Tm and the enthalpy of fusion of the powder are increased at the same time as its recyclability is increased if we add the amount and the nature of acid according to the invention, during a step of treatment with water as described in patent EP1413595.

Advantageously, the acid is added during a treatment of the polyamide with water, in which the polyamide in the solid state is brought into contact with water or steam containing the acid at a temperature near its crystallization temperature Tc for a sufficient time to effect this increase, then the water (or steam) is separated from the polyamide and the polyamide is dried.

Advantageously, the method according to the invention comprises the following steps:

A—Mixing the polyamide with a solution of water or of steam comprising from 0.1 to 5% of acid, the powder/solution weight ratio being in the range from 5 to 75%, preferably from 15 to 50%;

B—Subjecting the mixture to a temperature plateau in the range from Tc−20° C. to Tc+10° C., this step preferably having a duration from 2 to 100 hours, preferably from 2 to 30 hours;

C—Optionally, cooling the mixture to ambient temperature, i.e. to a temperature in the range from 10 to 50° C.;

D—Separating the water or steam from the polyamide to recover the dry polyamide. Preferably, the solution of water has a temperature in the range from 40 and 90° C. during step A, said heating making it possible to accelerate the dispersion and impregnation of the polyamide by the solution of acid.

The starting polyamide used in the method of the invention can be in the form of granules or powder. It is preferably in the form of powder with D50 in the range from 10 to 150 μm, preferably from 30 to 80 μm. When polyamide granules are used in the method according to the invention, at the end of the process they can be ground so as to obtain a powder with D50 in the range from 10 to 150 μm.

The present invention also relates to a polyamide obtainable by the method according to the invention, characterized in that it contains from 4000 to 10000 ppm of acid as defined above. This polyamide is in divided form, in the form of granules or powder, preferably in the form of powder with D50 in the range from 10 to 150 μm.

The present invention further relates to a process for manufacture of objects by agglomeration of polyamide powders by fusion using radiation or a sintering process, the powders being of composition according to that of the PA defined above or resulting from a method according to that described above. Any sintering device known in this field can be used, such as the devices marketed by EOS, 3D System, Aspect, Trump Precision Machinery. We may notably mention the equipment EOSINT P360 or Formiga P100 from EOS GmbH.

The present invention further relates to a manufactured 3D article obtained by fusion of a powder by means of electromagnetic radiation. This article can be selected from prototypes and models, notably in the automobile, nautical, aeronautic, aerospace, medical (prostheses, auditory systems, cellular tissues etc.), textile, clothing, fashion, decoration, design, electronic cabinets, telephony, home automation, IT, and lighting fields.

The parts manufactured by sintering of powder according to the invention, which have an intrinsic viscosity in solution above 1.5, advantageously have a modulus above 1300 MPa and an elongation at break greater than 15%, even after several recyclings (at least 4 recyclings) of the powder.

In the present description of the invention, including in the examples given below:

D50, also called "volume-median diameter" herein, corresponds to the value of particle size which divides the population of particles examined exactly in two. D50 is measured according to standard ISO 9276—parts 1 to 6: "Representation of data obtained by granulometric analysis". In the present description, a laser granulometer (Sympatec Helos) and software (Fraunhofer) are used to obtain the granulometric distribution of the powder and deduce D50 from that.

the intrinsic viscosity in solution (notably of the polyamide, of the powders or of the parts manufactured by sintering) is measured at a concentration of 0.5 wt. % in solution in metacresol of the total weight of the solution, at 20° C., by means of a Ubbelohde viscometer;

the mechanical properties, notably the tensile modulus and elongation at break, are measured according to standard ISO 527-2: 93-1BA.

analysis of the thermal characteristics of the polyamide is performed by DSC according to standard ISO 11357-3 "Plastics—Differential Scanning calorimetry (DSC) Part 3: Determination of temperature and enthalpy of melting and crystallization". The temperatures that are more particularly of interest to the invention are first-heat melting point (Tm1), the crystallization temperature (Tc) and the enthalpy of fusion.

EXAMPLES

Construction in Laser Sintering Machine (Formiga P100)

Reference powder PA 11: This is a powder of polyamide 11 with D50=50 μm, treated with water according to the method described in document EP1413595, said powder comprising less than 4000 ppm of acid.

Powder PA 11 according to the invention: This is a powder of polyamide 11 with D50=50 μm, treated according to the method of the invention, in this case treated with water in the same conditions as for the reference powder, except that the treatment water additionally contains the acid according to the invention. The PA11 powder obtained comprises in this case more than 4000 ppm of acid, and it complies with the invention, the acid being $H_3PO_4$ marketed by Febex.

In 4 successive constructions (runs 1 to 4) using the powder adopted (run 0) recycled successively at 100% during each run 1 to 4, the following were measured:

construction parameters (laser power required for melting the powder):

External laser power (corresponds to the contour of the part)

Internal laser power (corresponds to the interior of the part)

the respective viscosities of the powder and of the parts the mechanical properties of the parts constructed in X/Y:

modulus elongation at break

Figure 1:
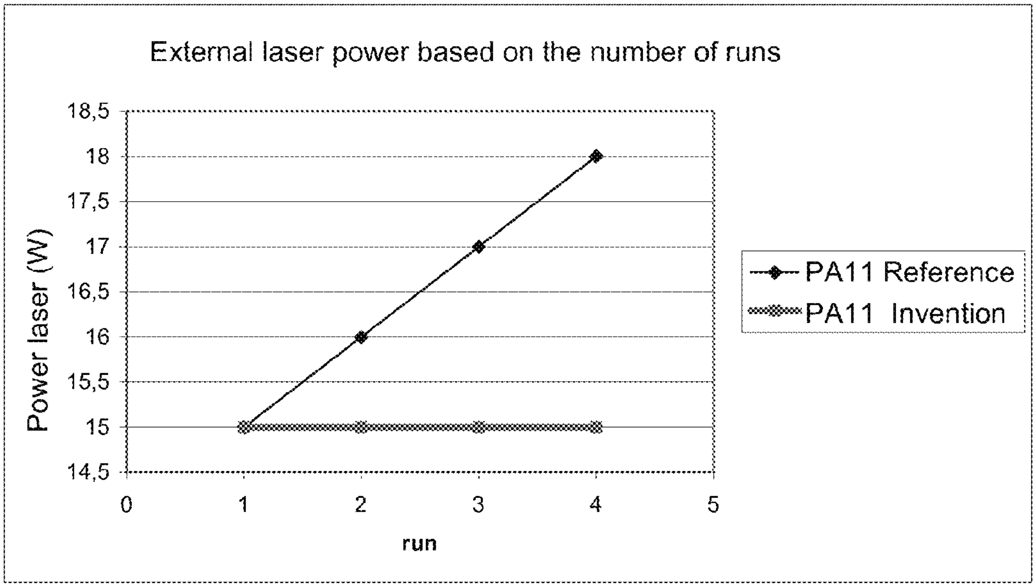
FIGS. 1-6 represent graphically the data contained in the Tables in the Examples.
Figure 2:
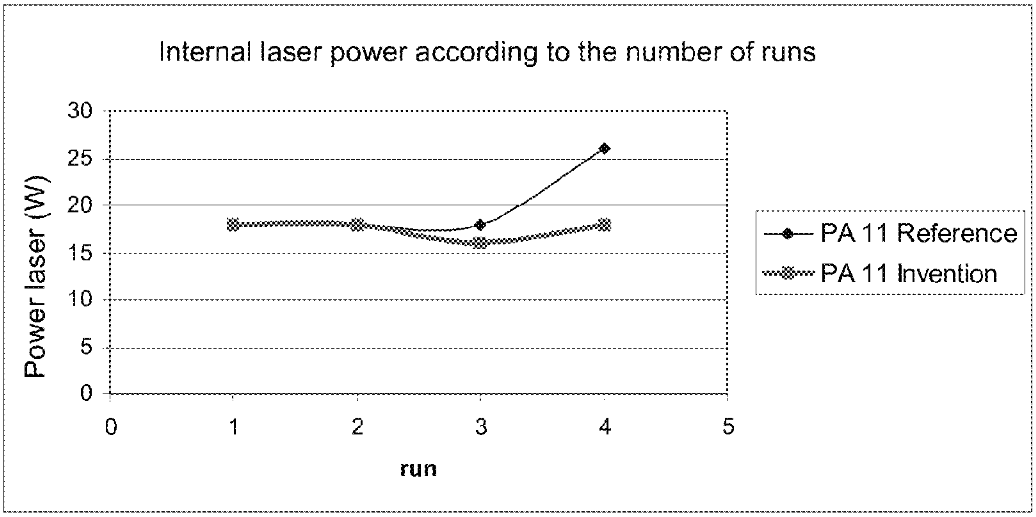

A) Construction Parameters:

It is found to be necessary to modify the construction parameters in the case of the reference powder as the runs proceed: increase in laser power (Table 1), which is not necessary in the case of the powder according to the invention (Table 2). This difference is clear from the respective graphs in FIGS. 1 and 2 and in Table 3.

TABLE 1

| Reference PA11 (comparative) | | | | | |
|---|---|---|---|---|---|
| Machine conditions | | Run 1 | Run 2 | Run 3 | Run 4 |
| Temperature of exposure chamber | | 176-177° C. | 176° C. | 176° C. | 178° C. |
| Temperature of shrinkage chamber | | 158° C. | 160° C. | 160° C. | 160° C. |
| Contour | Laser power | 15 W | 16 W | 17 W | 18 W |
| | Speed | 1500 mm/s | 1500 mm/s | 1500 mm/s | 1500 mm/s |
| Hatching | Laser power | 18 W | 18 W | 18 W | 26-27 W |
| | Speed | 3000 mm/s | 3000 mm/s | 3000 mm/s | 3000 mm/s |
| | Ray displacement | 0.2 mm | 0.2 mm | 0.2 mm | 0.2 mm |

TABLE 2

| PA11 according to invention | | | | | | | |
|---|---|---|---|---|---|---|---|
| Machine conditions | | Test 1 | Test 2 | Test 3 | Test 4 | Test 5 | Test 6 |
| Temperature of exposure chamber | | 175° C. | 176° C. | 176° C. | 177° C. | 178° C. | 176° C. |
| Temperature of shrinkage chamber | | 170° C. | 170° C. | 170° C. | 150° C. | 156° C. | 158° C. |
| Contour (before and after hatching) | Laser power | 15 W | 15 W | 15 W | 15 W | 15 W | 15 W |
| | Speed | 1500 mm/s | | | | | |
| Hatching | Laser power | 18 W | 18 W | 16 W | 16 W | 18 W | 18 W |
| | Speed | 3000 mm/s | 3000 mm/s | 3000 mm/s | 3000 mm/s | 3000 mm/s | 3000 mm/s |
| | Ray displacement | 0.2 mm | 0.2 mm | 0.2 mm | 0.2 mm | 0.2 mm | 0.2 mm |

TABLE 3

| Comparison of the variation in laser power | | | | |
|---|---|---|---|---|
| | Laser power (external) (W) | | Laser power (internal) (W) | |
| | PA 11 Reference | PA 11 Invention | PA 11 Reference | PA 11 Invention |
| run 1 | 15 | 15 | 18 | 18 |
| run 2 | 16 | 15 | 18 | 18 |
| run 3 | 17 | 15 | 18 | 16 |
| run 4 | 18 | 15 | 26 | 18 |

B) Variation in Viscosity of the Powders and of the Parts:

As the runs proceed, the viscosity of the powder in the solid state ("surrounding" powder) according to the invention remains stable and lower than that of the reference powder. Moreover, it always remains below 2, in contrast to the reference.

TABLE 4

| | Viscosity of the powder | | Viscosity of the part | |
|---|---|---|---|---|
| | PA 11 reference | PA 11 Invention | PA 11 reference | PA 11 Invention |
| run 0 | 1.27 | 1.21 | 1.27 | 1.21 |
| run 1 | 2.36 | 1.85 | 2.05 | 1.84 |
| run 2 | 2.47 | 1.81 | 2.3 | 1.91 |
| run 3 | 2.3 | 1.94 | 2.39 | 1.99 |
| run 4 | 2.18 | 1.88 | 2.33 | 2.01 |
| run 5 | | 1.89 | | 2.06 |

The viscosity of the parts obtained with the powder according to the invention is above 1.5 starting from the first construction (run 1) thus ensuring acceptable mechanical properties (cf. point C).

Figure 3:
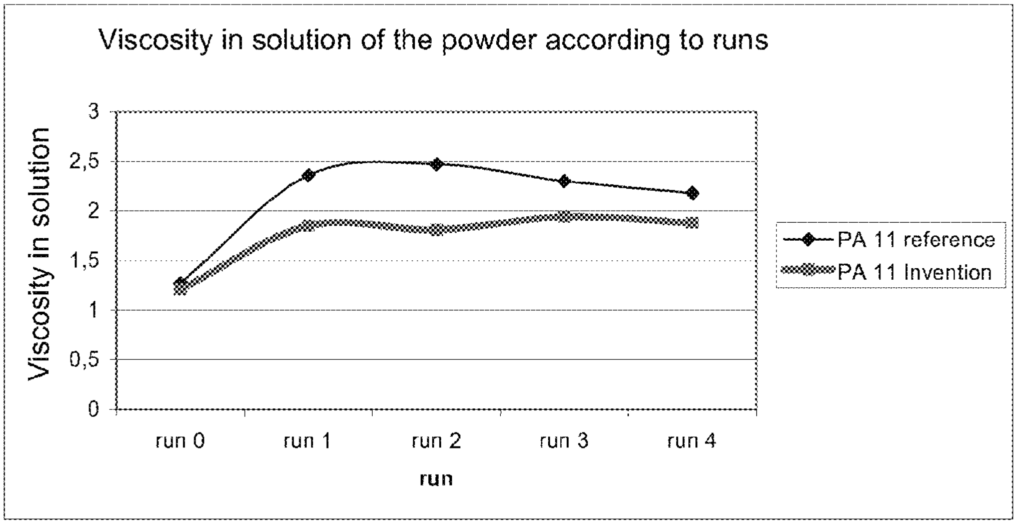
Figure 4:
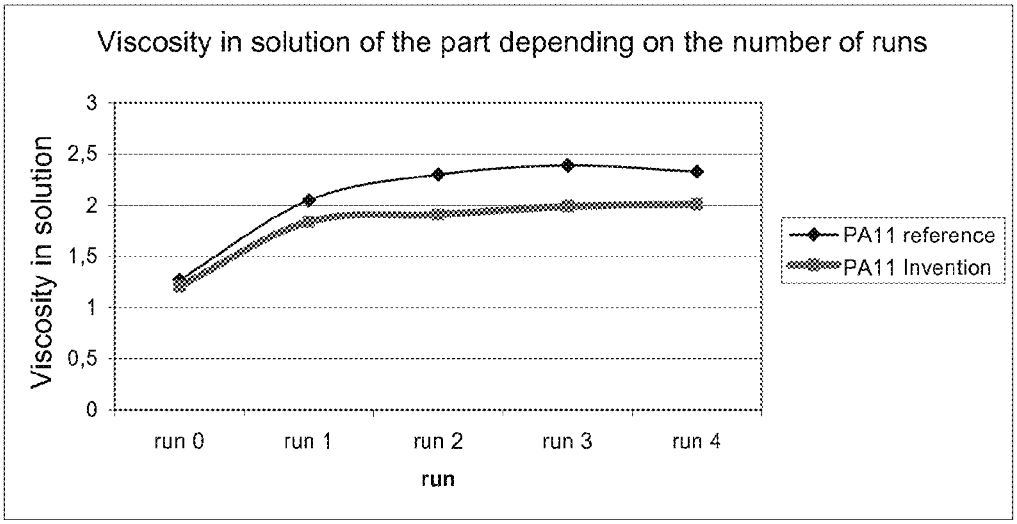

These variations, presented in Table 4, are also shown on the graphs in FIGS. 3 and 4.

C) Variation in Mechanical Properties:

Table 5 shows the variation in tensile modulus and the variation in elongation at break respectively for the part obtained from reference powder PA11 and for that according to the invention.

TABLE 5

| | Tensile modulus (MPa) | | Elongation at break (%) | |
|---|---|---|---|---|
| | PA Reference | PA 11 Invention | PA Reference | PA 11 Invention |
| run 1 | 1750 | 1905 | 29.6 | 25 |
| run 2 | 1240 | 1665 | 28 | 24 |
| run 3 | 700 | 1523 | 23 | 25 |
| run 4 | 300 | 1342 | 12 | 24 |

Figure 5:
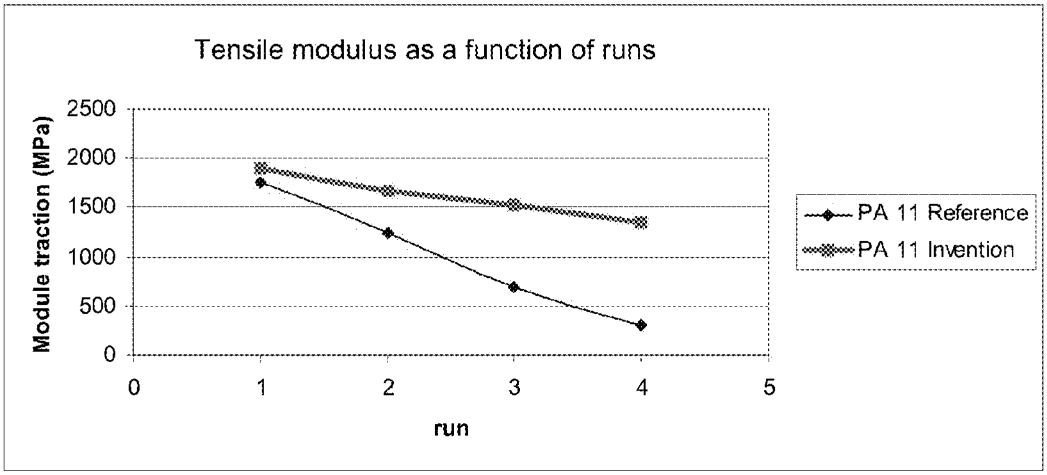
Figure 6:
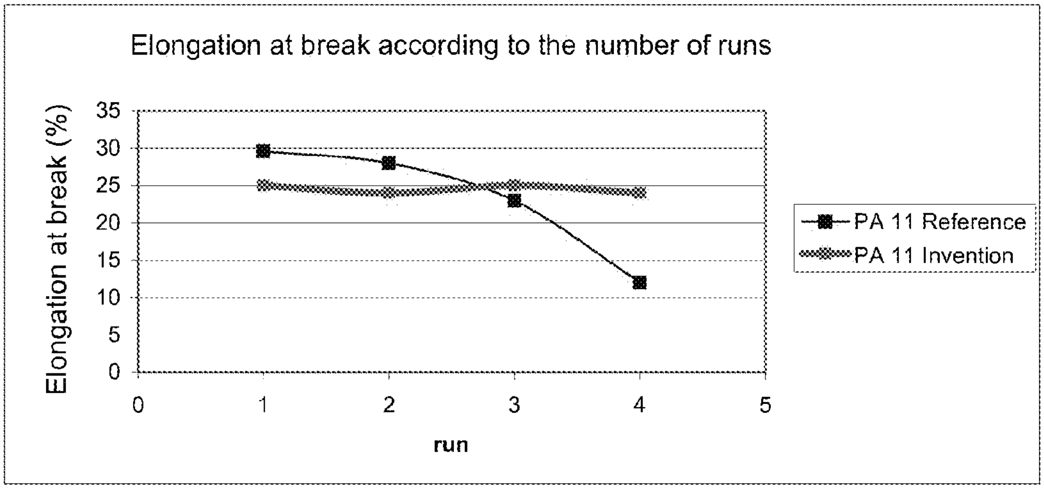

These variations are also shown on the graphs in FIGS. 5 and 6:

Variation in tensile modulus: even after 4 runs, the modulus of the part manufactured from powder PA 11 according to the invention remains above 1300 MPa. Regarding the part obtained from the reference powder PA 11, its modulus is below 1300 MPa starting from the second run, therefore its mechanical properties are not acceptable.

Variation in elongation at break: the elongation at break remains stable for the part manufactured from powder PA 11 according to the invention, always above 20%. In contrast, a large decrease in elongation at break, falling below 15% starting from the 4th run for the part obtained from reference powder PA 11, resulting in parts whose mechanical properties are not acceptable.

Finally, by controlling the nature and the amount of acids within the polyamide powder that is employed during the first construction by sintering, the method according to the invention makes it possible to increase the recyclability of the powder (recyclable at least 4 times in the above examples), reproducible objects with acceptable mechanical properties being obtained each time by sintering, as shown in the above examples. The method according to the invention involves supplying a powder, in which the variation in molecular weight of the molten powder and of the powder that is not melted during each construction was controlled simply in advance in the powder that is employed during the first construction.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 1154744, filed 31 May 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for increasing the recyclability of a polyamide in a sintering process, comprising incorporating 4000 to less than 10,000 ppm of at least one acid in the polyamide, said acid being an acid of formula HxPyOz in which x, y and z are integers of 1 to 7, boric acid, or a salt, ester, anhydride of these acids or a mixture thereof wherein the acid is added during treatment of the polyamide with water by contacting the polyamide in solid state with water or steam containing the acid at a temperature near its crystallization temperature Tc for a sufficient time to effect the increase, then the water or steam is separated from the polyamide and the polyamide is dried.

2. The method according to claim 1, wherein said at least one acid is hypophosphorous acid $H_3PO_2$, phosphorous acid $H_3PO_3$, phosphoric acid $H_3PO_4$, pyrophosphoric acid $H_4P_2O_7$, a metal phosphate, a metal phosphite, a metal hypophosphite, or a phosphoric or phosphorous ester, anhydride, or mixture thereof.

3. The method according to claim 1, wherein said at least one acid comprises a mixture of hypophosphorous acid $H_3PO_2$ and of phosphoric acid $H_3PO_4$, in a weight ratio in the range from 10/90 to 90/10.

4. The method according to claim 1, wherein the acid is incorporated by at least one of the following methods: impregnation of the polyamide in an aqueous dispersion of the acid, addition of acid during synthesis of the polyamide, at the beginning or at the end of synthesis, addition by mixing by compounding, or during any step of a process for manufacture of powder from said polyamide, by dissolution-precipitation of polyamide in a solvent containing the acid.

5. The method according to claim 1, comprising:

Mixing the polyamide with a solution of water or of steam comprising 0.1 to 5% of acid, the powder/solution weight ratio being in the range from 5 to 75%;

Subjecting the mixture to a temperature plateau in the range from Tc−20° C. to Tc+10° C.

Separating the water or steam from the polyamide to recover the dry polyamide.

6. The method according to claim 1, wherein the polyamide is PA11, PA12, PA10.10, an aliphatic polyamide resulting from the condensation of an aliphatic diamine having from 6 to 12 carbon atoms and an aliphatic diacid having from 9 to 12 carbon atoms or a copolyamide 11/12 having either more than 90% of units 11 or more than 90% of units 12.

7. The method according to claim 1, wherein the polyamide is in the form of granules or powder.

8. The method according to claim 1, wherein the polyamide is in the form of granules or powder having a volume-median diameter D50 of 10-150 μm.

9. The polyamide powder obtainable according to the method of claim 1, containing from 4000 to less than 10000 ppm of acid.

10. A sintering process, comprising subjecting a polyamide powder according to claim 9 to sintering conditions.

11. A manufactured article obtained by fusion of a powder according to claim 9 by electromagnetic radiation.

* * * * *